(12) United States Patent
Chang et al.

(10) Patent No.: US 8,250,484 B2
(45) Date of Patent: Aug. 21, 2012

(54) COMPUTER AND METHOD FOR GENERATIING EDGE DETECTION COMMANDS OF OBJECTS

(75) Inventors: Chih-Kuang Chang, Taipei Hsien (TW); Zhong-Kui Yuan, Shenzhen (CN); Yi-Rong Hong, Shenzhen (CN); Xian-Yi Chen, Shenzhen (CN); Dong-Hai Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 197 days.

(21) Appl. No.: 12/853,302

(22) Filed: Aug. 10, 2010

(65) Prior Publication Data

US 2011/0161876 A1 Jun. 30, 2011

(30) Foreign Application Priority Data

Dec. 31, 2009 (CN) .......................... 2009 1 0312914

(51) Int. Cl.
*G06F 3/14* (2006.01)
*G06F 3/17* (2006.01)

(52) U.S. Cl. .......... 715/810; 715/803; 700/16; 704/276; 714/752; 719/329; 386/125

(58) Field of Classification Search .......... 715/200–277, 715/700–867; 700/701–866; 709/201–229; 705/50–79, 500; 345/30–111; 382/154; 348/345; 463/43; 702/182
See application file for complete search history.

(56) References Cited

U.S. PATENT DOCUMENTS

| 6,571,008 | B1 * | 5/2003 | Bandyopadhyay et al. | .. 382/154 |
| 7,574,323 | B2 * | 8/2009 | Rappaport et al. | ............ 702/182 |
| 8,152,645 | B2 * | 4/2012 | Walker | ............................ 463/43 |
| 2004/0125228 | A1 * | 7/2004 | Dougherty | .................... 348/345 |
| 2009/0271336 | A1 * | 10/2009 | Franks | .......................... 705/500 |

* cited by examiner

*Primary Examiner* — Ruay Ho
(74) *Attorney, Agent, or Firm* — Altis Law Group, Inc.

(57) ABSTRACT

A computer and a method for generation commands include loading a data exchange format (DXF) image, and selecting a measurement tool and selecting a DXF feature of the DXF image. The generation commands method further includes generating an edge detection command of the selected DXF feature according to the measurement tool when the size of the selected DXF feature is not larger than the size of an image area. And an edge detection command corresponding to each of the reselected measurement tools is generated when the size of the selected DXF feature is larger than the size of the image area.

12 Claims, 4 Drawing Sheets

COMPUTER AND METHOD FOR GENERATIING EDGE DETECTION COMMANDS OF OBJECTS

BACKGROUND

1. Technical Field

Embodiments of the present disclosure relate to generating commands, and in particular, to a computer and method for generating commands for edge detection of an object in an image.

2. Description of Related Art

Many images of workpieces are stored in the data exchange format (DXF). A DXF image includes all information related to the workpiece. It is important to use proper measurement programs used to detect edges of a DXF image of a workpiece. However, if the size of a selected DXF feature in the DXF image is larger than the size of an image area to display the selected DXF feature, the measurement program to measure the selected DXF feature may be affected. Accordingly, the measurement machines cannot invoke that measurement program to measure the DXF drawing accurately.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
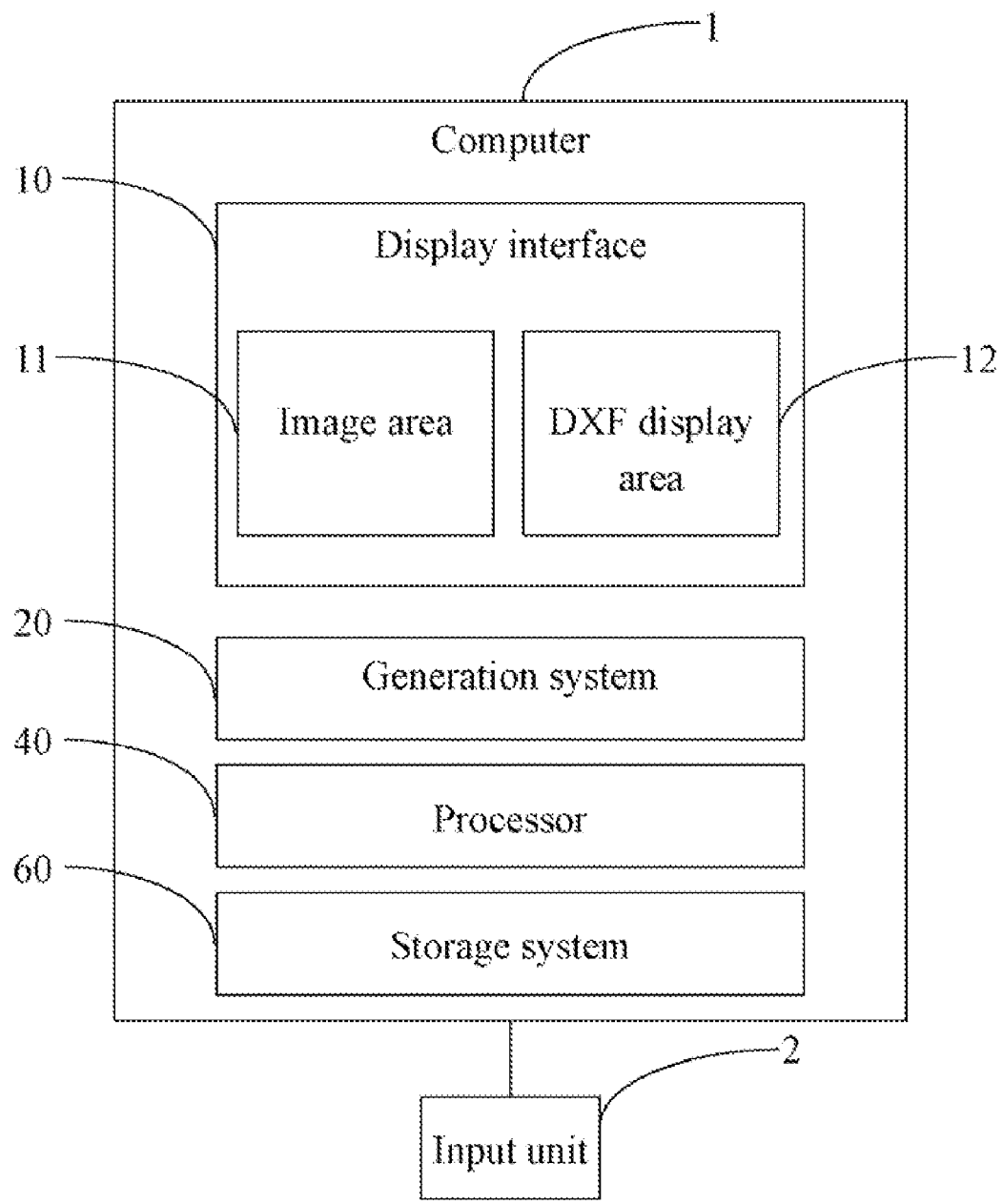
FIG. 1 is a block diagram of one embodiment of a computer including a generation system.

FIG. 1 is a block diagram of one embodiment of a computer 1 including a generation system 20. The generation system 20 may be used to generate a command that can be used to detect one or more edges (hereinafter, "edge detection commands") of an object in an image. In some embodiments, the edge detection commands may be used to control a measurement device to detect or search and measure edge of the object. The object may be a workpiece, or an accessory of the workpiece, for example.

The computer 1 includes a display interface 10. The display interface 10 provides an image area 11 and a DXF display area 12 to display different information. A user may view an actual size of the object through the image area 11, where the actual size of the object is affected by a display ratio of the image area 11. For example, if the display ratio is 7.1 mm×5.3 mm, the maximum size of 7.1 mm×5.3 mm of the object can be viewed through the image area 11, and if the display ratio is 1.0 mm×0.7 mm, the maximum size of 1.0 mm×0.7 mm of the object can be viewed through the image area 11. The DXF display area 12 may display a DXF image of the object. In response to the user selecting a DXF feature of the DXF image in the DXF display area 12, a measurement program of the selected DXF feature is generated. By executing the generated measurement program, an actual size of the selected DXF feature can be viewed in the image area 11.

The computer 1 may be connected to an input unit 2. The input unit 2 may be used to select the DXF feature from the DXF image. In some embodiments, the input unit may be a mouse, or a keyboard, for example. The computer 1 further includes a processor 40 and a storage system 60. The processor 40 executes one or more computerized operations of the computer 1 and other applications, to provide the functions of the computer 1 and the generation system 20. The storage device 60 may be a memory of the computer 1 and also may be an external storage card, such as a smart media (SM) card or secure digital (SD) card, for example.

Figure 2:
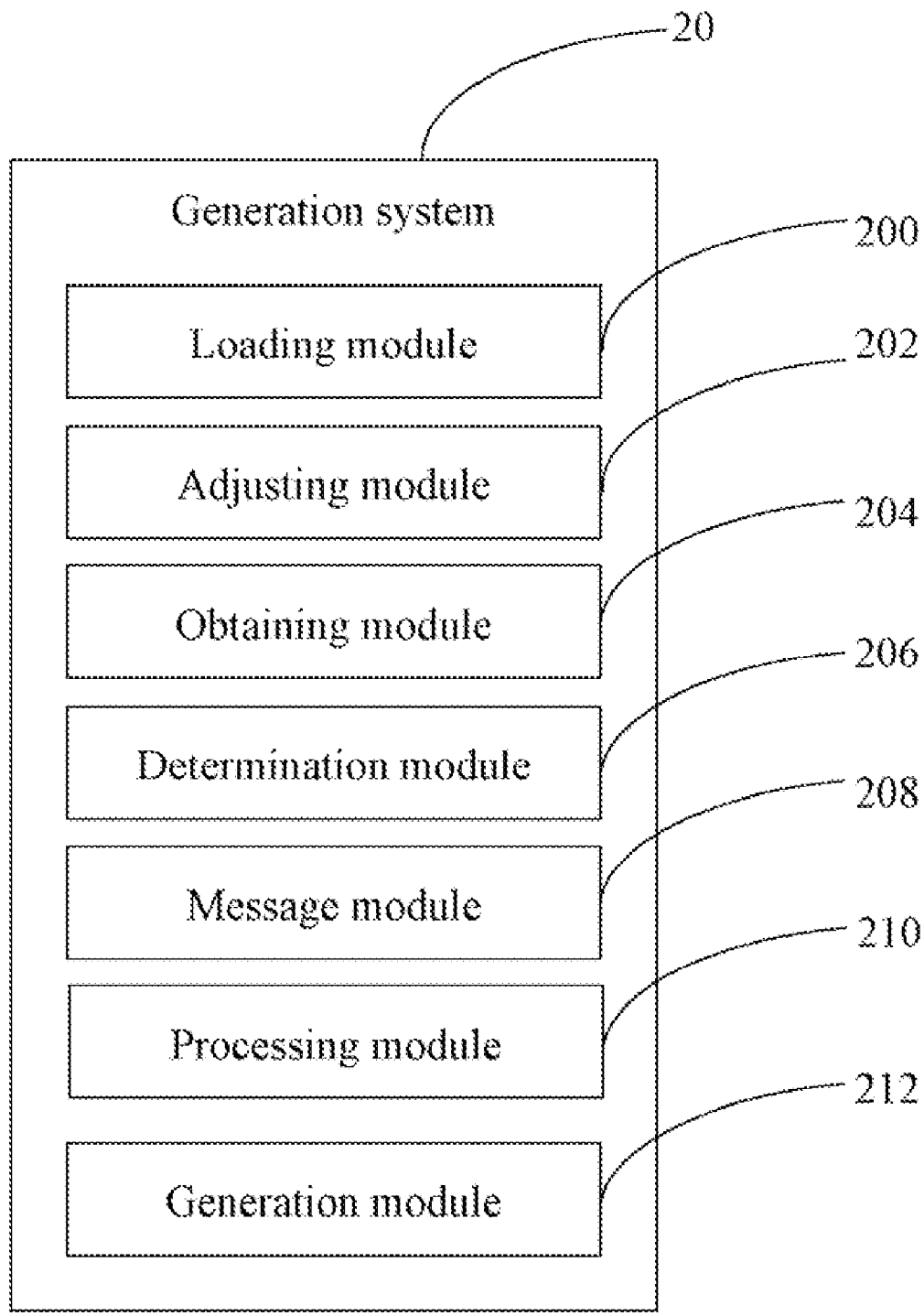
FIG. 2 is a block diagram of one embodiment of the generation system of FIG. 1.

FIG. 2 is a block diagram of one embodiment of the generation system 20 of FIG. 1. In some embodiments, the generation system 20 includes a loading module 200, an adjusting module 202, an obtaining module 204, a determination module 206, a message module 208, a processing module 210, and a generation module 212. The modules 200, 202, 204, 206, 208, 210, and 212 may comprise one or more computerized codes to be executed by the processor 40 to perform one or more operations of the generation system 20. Details of these operations will be provided below.

The loading module 200 loads a DXF image of an object to be measured, and displays the DXF image on the DXF display area 12.

The adjusting module 202 adjusts a display proportion of the DXF display area 12 to make the DXF display area 12 display full screen on the computer 1. Full screen represents displaying the DXF display area 12 on a maximum viewing area of a screen of the computer 1.

In response to receiving operations using the input unit 2, the obtaining module 204 determines a selected DXF feature on the DXF image, and determines a measurement tool to measure the DXF image. The measurement tool has different types of tools, such as a point searching tool, a line searching tool, an arc searching tool, a surface focusing tool, for example. The selected DXF feature may be a point, a line, a surface, a circle, an arc, or an ellipse, for example.

The obtaining module 204 further determines a size of the image area 11. The size represents a length and a width of the image area 11. The obtaining module 204 further determines a size of the selected DXF feature according to information provided by the DXF image.

The determination module 206 determines whether the measurement tool is appropriate to measure the selected DXF feature. In some embodiments, if the measurement tool is the line searching tool and the selected DXF feature is an arc, the determination module 206 determines that the measurement tool is not appropriate to measure the selected DXF feature. If the measurement tool is the point searching tool, and the selected DXF feature is a point, a line, or any other DXF features that is formed by point(s), the determination module 206 determines that the measurement tool is appropriate to measure the selected DXF feature.

Upon the condition that the measurement tool is not appropriate to measure the selected DXF feature, the message module 208 displays a prompt message on the display interface 10 to prompt the user to reselect the measurement tool or the selected DXF feature.

If the measurement tool is appropriate to measure the selected DXF feature, the determination module 208 determines whether the size of the selected DXF feature is larger than that of the size of the image area 11. In some embodiments, the determination module 208 compares the size of the selected DXF feature with the size of the image area 11. For example, the size of the image area 11 can be 7.1 mm×5.3 mm, and the selected DXF feature can be a line. If the line is horizontal, the determination module 206 determines that the size of the selected DXF feature is larger than the size of the image area 11 if that the length of the line is larger than 7.1 mm. If the line is vertical, the determination module 206 determines that the size of the selected DXF feature is larger than the size of the image area 11 under the condition that the length of the line is larger than 5.3 mm.

Upon the condition that the size of the selected DXF feature is not larger than the size of the image area 11, the processing module 210 receives an instruction from the input unit 2, and the generation module 212 obtains location information of the selected DXF feature in the DXF display area 12. In response to receiving the instruction from input unit 2, the generation module 212 generates an edge detection command of the selected DXF feature according to the selected measurement tool. In some embodiments, the location information includes coordinates of a center of the selected DXF feature, and an angle between the selected DXF feature and a positive direction of a horizontal line of DXF display area 12. The generated edge detection command includes location information of the selected measurement tool. For example, the location information includes coordinates of a center of the measurement tool, an angle A between the measurement tool and the positive direction of the horizontal line, and an edge detection range of the measurement tool. For example, the search range may be a square, thus the searching range has a length L and width W. The edge detection command further includes a direction to select points D, a sensitivity F of the DXF image, a minimum threshold G of selecting points, and a number C of the selected points of the measurement tool, for example. The edge detection range, the direction to selecting points D, the sensitivity F, the minimum threshold G of selecting points, and the number C of the picking points of the measurement tool may be predetermined value accord to each kind of the measurement tool.

In some embodiments, the angle A between the measurement tool and the positive direction of the horizontal line is the same as the angle between the selected DXF feature and positive direction of the horizontal line. The length L of the edge detection range may be 400 pixels, and the width W of the edge detection range may be 30 pixels. The direction of selecting points D may be White to Black, Black to White, or Random. The sensitivity F may be an even number between 0~200 or −1. The value "−1" represents an automatic enactment. The minimum threshold G of selecting points may be one random number between 1~255 or −1. The "−1" represents that the minimum threshold is calculated automatically. The number C of the selected points is at least 2. Upon the condition that the edge detection command including all the information of the measurement tool is generated, and the searching command is executed, the measurement tool does an edge detection measurement according to the edge detection command.

Upon the condition that the size of the selected DXF feature is larger than the size of the image area 11, the processing module 210 reselects at least two measurement tools. The numbers of the measurement tool is set according to preferences of the user.

The generation module 212 further generates an edge detection command corresponding to each of the reselected measurement tools. Detail descriptions will be provided below.

If the size of the selected DXF feature is not larger than the size of the image area 11, the center of the selected DXF feature are regarded as the center of the measurement tool.

If the size of the selected DXF feature is larger than the size of the image area 11, the center of the measurement tool is confirmed as follows. The selected DXF feature is smoothed by removing rough edges of the selected DXF feature, and divided averagely into a plurality of sections according to a number of the reselected measurement tools. Each of the sections of the selected DXF feature has two node points, such as a start point and an end point. The start point of each of the sections is determined as the center of one of the reselected measurement tools. A specific example is provided as below.

Figure 3:
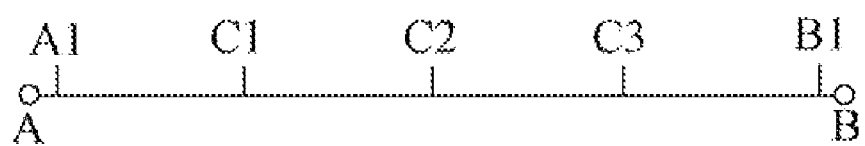
FIG. 3 is a schematic diagram of one embodiment of a method for confirming a center coordinate of measurement tools.

For example, a length of the selected DXF feature is 8 mm, the selected DXF feature is smoothed by subtracting a predetermined length (e.g., 1.5 mm) from two node points of the selected DXF feature. That is, a rest length M of the selected DXF feature is 5 mm after smoothing the selected DXF feature. It is assumed that the number of the measurement tool is N, thus, the displayed length of 5 mm of the selected DXF feature is averaged to N-1 sections. Then, N-2 points are determined according to the N-1 sections. Each start point of the N-1 sections is determined to be the center of the N measurement tools. As shown in FIG. 3, if the total length of the selected DXF feature is M+3 (mm), and two node points of the selected DXF feature are point A and point B. After smoothing the selected DXF feature, the two node points of the selected DXF feature are changed to point A1 and point B1. Upon the condition that the numbers of measurement tool is 5, the M (mm) is averaged to 4 sections. Then the selected DXF feature has 5 node points A1, C1, C2, C3, and B1. The node points of A1, C1, C2, C3, and B1 are determined to be the center of the 5 measurement tools.

In some embodiments, for example, the obtaining module 204 selects the line searching tool as the selected measurement tool, and the size of the image area 11 is 7.1 mm×5.3 mm. A length of the selected DXF feature (e.g., a line feature) is 0.7527 mm. The determination module 206 determines that the size of the selected DXF feature is not larger than the size of the image area 11. In response to receiving the instruction from the input unit 2, the generation module 212 obtains the location information of the line feature, and generates the edge detection command of the selected DXF feature (e.g., the line feature) according to the selected measurement tool (e.g., the line searching tool). The search edge command is represented as TLine (X:=122.0046, Y:=148.4207, A:=90.0000, L:=400, W:=30, D:=Random, F:=−1, G:=−1, C:=2). If the obtained length of the line feature is 20.146 mm, the determination module 206 determines that the size of the selected DXF feature is larger than the size of the image area 11. The generation module 212 obtains the coordinates of the two ends of the line feature, for example, the coordinates are (124.1213,136.1920) and (124.1213,156.3379). In response to the numbers of the reselected measurement tool is 2, a generation module 212 and generates an edge detection command corresponding to each of the reselected 2 measurement tools. For example, the edge detection commands may be TLine (X:=124.1213, Y:=137.6920, A:=90.0000, L:=400, W:=30, D:=Random, F:=−1, G:=−1, C:=2); MoveTo (X:=124.1213, Y:=154.8379, Z:=0.0000); and
TLine (X:=124.1213, Y:=154.8379, A:=90.0000, L:=400, W:=30, D:=Random, F:=−1, G:=−1, C:=2).

It should be noted that the maximum length being viewed in the image area 11 is 7.1 mm. In response there are 2 measurement tools which are set by the user, the length of the object being viewed in image area 11 is {7.1+7.1} mm. If a total length 20.146 mm of the line feature is required to measured, the numbers of the measurement tools may be set as 3, and the length of the object being viewed on the image area 11 is {7.1+7.1+7.1} mm. In response to the 3 reselected measurement tools, the generation module 212 generates three edge detection commands corresponding to the reselected 3 measurement tools as follows: TLine (X:=124.1213, Y:=140.6920, A:=90.0000, L:=400, W:=30, D:=Random, F:=−1, G:=−1, C:=2);
MoveTo (X:=124.1213, Y:=151.7650, Z:=0.0000); TLine (X:=124.1213, Y:=151.7650, A:=90.0000, L:=400, W:=30, D:=Random, F:=−1, G:=−1, C:=2);
MoveTo (X:=124.1213, Y:=162.8379, Z:=0.0000); and TLine (X:=124.1213, Y:=162.8379, A:=90.0000, L:=400, W:=30, D:=Random, F:=−1, G:=−1, C:=2).

Figure 4:
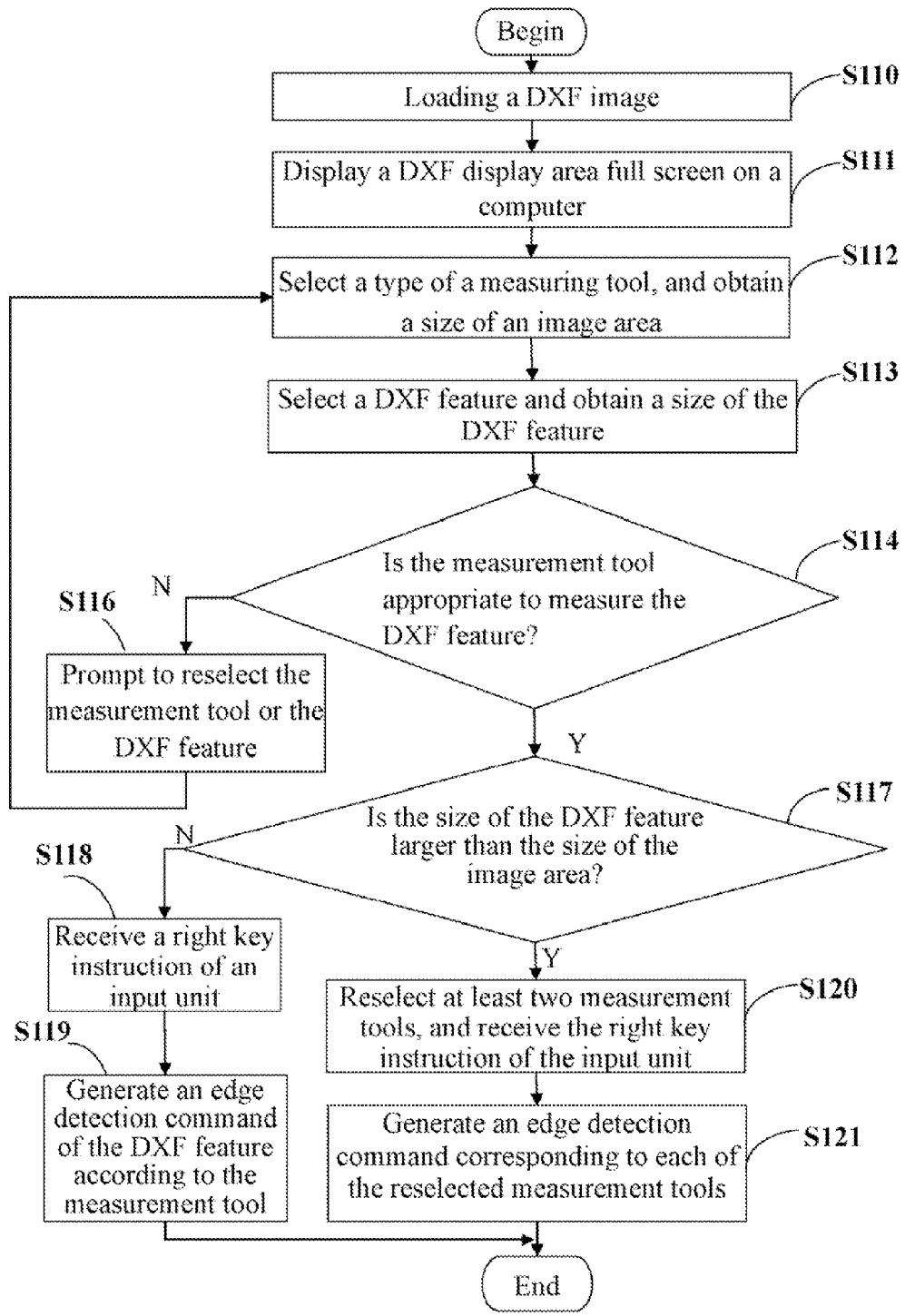
FIG. 4 is a flowchart of one embodiment for generating edge detection commands of the computer of FIG. 1.

FIG. 4 is a flowchart of one embodiment of generating edge detection commands of the computer of FIG. 1. Depending on the embodiment, additional blocks may be added, others removed, and the ordering of the blocks may be changed.

In block S110, the loading module 200 loads a DXF image of an object to be measured, and displays the DXF image on the DXF display area 12.

In block S111, the adjusting module 202 adjusts a display proportion of the DXF display area 12 to make the DXF display area 12 display full screen on the computer 1.

In block S112, the obtaining module 204 determines a selected measurement tool by receiving operations of the input unit 2, and determines a size of the image area 11. The size represents a length and a width of the image area 11. As mentioned above, the measurement tool has different types, such as a point searching tool, a line searching tool, an arc searching tool, a surface focusing tool, for example.

In block S113, the obtaining module 204 further determines a selected DXF feature on the DXF image in response to operations using the input unit 2, and determines the size of DXF feature according to information provided by the DXF image. As mentioned above, the selected DXF feature may be a point, a line, a surface, a circle, an arc, or an ellipse, for example.

In block S114, the determination module 206 determines whether the measurement tool is appropriate to measure the selected DXF feature.

If the measurement tool is not appropriate to measure the selected DXF feature, in block S116, the message module 208 displays a prompt message on the display interface 10 to prompt to reselect the measurement tool or the selected DXF feature, and returning the selecting step. And if the measurement tool is appropriate to measure the selected DXF feature, in block S117, the determination module 208 further determines whether the size of the selected DXF feature is larger than the size of the image area 11.

If the size of the selected DXF feature is not larger than the size of the image area 11, in block S118, the processing module 210 receives an instruction of the input unit 2. And in block S119, the generation module 212 obtains location information of the selected DXF feature in the DXF display area 12, and generates an edge detection command of the selected DXF feature according to the measurement tool according to the location information. As mentioned above, the location information includes coordinates of the center of the selected DXF feature, an angle between the selected DXF feature and positive direction of a horizontal line of the DXF display area 12.

If the size of the selected DXF feature is larger than the size of the image area 11, in block S120, the processing module 210 reselects at least two measurement tools and receives the right key instruction. And in block S121, the generation module 212 generates an edge detection command corresponding to each of the reselected measurement tools.

It should be emphasized that the described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be comprised herein within the scope of this disclosure and the above-described inventive embodiments, and the present disclosure is protected by the following claims.

What is claimed is:

1. A method for generating edge detection commands of an object using a computer, the computer providing a display interface, the display interface comprising an image area and a data exchange format (DXF) display area, the method comprising:
    loading a DXF image of the object and displaying the DXF image on the DXF display area;
    selecting a measurement tool to measure the DXF image and selecting a DXF feature on the DXF image;
    obtaining a size of the selected DXF feature and a size of the image area;
    determining whether the size of the selected DXF feature is larger than the size of the image area, upon the condition that the measurement tool is appropriate to measure the selected DXF feature;
    obtaining location information of the selected DXF feature in the DXF display area, and the location information of the selected DXF feature comprises coordinates of a center of the selected DXF feature, an angle between the selected DXF feature and positive direction of a horizontal line;
    generating an edge detection command of the selected DXF feature according to the measurement tool, upon the condition that the size of the selected DXF feature is not larger than the size of the image area, the edge detection command according to the measurement tool comprising the location information of the measurement tool, and the location information of the measurement tool comprising a center of the measurement tool, an angle between the measurement tool and positive direction of the horizontal line, and an edge detection range of the measurement tool; or
    reselecting at least two measurement tools, and generating an edge detection command corresponding to each of the reselected measurement tools, upon the condition that the size of the selected DXF feature is larger than the size of the image area, the edge detection command corresponding to each of the reselected measurement tools comprising location information of each of the reselected the measurement tools, an angle between each of the reselected the measurement tools and positive direction of the horizontal line, and an edge detection range of each of the reselected the measurement tools, wherein coordinates of a center of each of the reselected measurement tool of the location information of the each of the reselected the measurement tools is confirmed by:

smoothing the selected DXF feature by removing rough edge of the selected DXF feature;

dividing the selected DXF feature averagely according to a number of the reselected measurement tools, the divided DXF feature having at least two node points corresponding to the reselected measurement tools; and determining each of the node points as the center of one of the reselected measurement tools.

2. The method as described in claim 1, further comprising:
adjusting a display proportion of the DXF display area to make the DXF display area display full screen on the computer.

3. The method as described in claim 1, further comprising:
displaying a prompt message on the display interface to prompt a user to reselect the measurement tool or the selected DXF feature upon the condition that the measurement tool is not appropriate to measure the selected DXF feature, and returning the selecting step.

4. The method as described in claim 1, wherein the coordinates of the center of the measurement tool are the same as the coordinates of the center of the selected DXF feature to determine a location of the measurement tool, upon the condition that the size of the selected DXF feature is not larger than the size of the image area.

5. A storage medium storing a set of instructions, the set of instructions capable of being executed by a processor to perform a method for generating edge detection commands of an object using a computer, the computer providing a display interface, the display interface comprising an image area and a data exchange format (DXF) display area, the method comprising:

loading a DXF image of the object and displaying the DXF image on the DXF display area;

selecting a measurement tool to measure the DXF image and selecting a DXF feature on the DXF image;

obtaining a size of the selected DXF feature and a size of the image area;

determining whether the size of the selected DXF feature is larger than the size of the image area, upon the condition that the measurement tool is appropriate to measure the selected DXF feature;

obtaining location information of the selected DXF feature in the DXF display area, and the location information of the selected DXF feature comprises coordinates of a center of the selected DXF feature, an angle between the selected DXF feature and positive direction of a horizontal line;

generating an edge detection command of the selected DXF feature according to the measurement tool, upon the condition that the size of the selected DXF feature is not larger than the size of the image area, the edge detection command according to the measurement tool comprising the location information of the measurement tool, and the location information of the measurement tool comprising a center of the measurement tool, an angle between the measurement tool and positive direction of the horizontal line, and an edge detection range of the measurement tool; or reselecting at least two measurement tools, and generating an edge detection command corresponding to each of the reselected measurement tools, upon the condition that the size of the selected DXF feature is larger than the size of the image area, the edge detection command corresponding to each of the reselected measurement tools comprising location information of each of the reselected the measurement tools, an angle between each of the reselected the measurement tools and positive direction of the horizontal line, and an edge detection range of each of the reselected the measurement tools, wherein coordinates of a center of each of the reselected measurement tool of the location information of the each of the reselected the measurement tools is confirmed by:

smoothing the selected DXF feature by removing rough edge of the selected DXF feature;

dividing the selected DXF feature averagely according to a number of the reselected measurement tools, the divided DXF feature having at least two node points corresponding to the reselected measurement tools; and determining each of the node points as the center of one of the reselected measurement tools.

6. The storage medium as described in claim 5, further comprising:
adjusting a display proportion of the DXF display area to make the DXF display area display full screen on the computer.

7. The storage medium as described in claim 5, further comprising:
displaying a prompt message on the display interface to prompt a user to reselect the measurement mean or the selected DXF feature upon the condition that the measurement tool is not appropriate to measure the selected DXF feature, and returning the selecting step.

8. The method as described in claim 5, wherein the coordinates of the center of the measurement tool are the same as the coordinates of the center of the selected DXF feature to determine a location of the measurement tool, upon the condition that the size of the selected DXF feature is not larger than the size of the image area.

9. A computer for generation commands of an object, a display interface of the computer comprising an image area and a data exchange format (DXF) display area, the computer comprising:

a storage device;

at least one processor; and one or more programs stored in the storage device and being executable by the at least one processor, the one or more programs comprising:

a loading module operable to load a DXF image of the object and displaying the DXF image on the DXF display area;

an obtaining module operable to select a measurement tool to measure the DXF image and select a DXF feature on the DXF image, and the obtaining module further operable to obtain a size of the selected DXF feature and a size of the image area;

a determination module operable to determine whether the size of the selected DXF feature is larger than the size of the image area, upon the condition that the measurement tool is appropriate to measure the selected DXF feature;

a generation module operable to obtain location information of the selected DXF feature in the DXF display area, and the location information of the selected DXF feature in the DXF display area comprises coordinates of a center of the selected DXF feature, an angle between the selected DXF feature and positive direction of a horizontal line, and the generation module further operable to generate an edge detection command of the selected DXF feature according to the measurement tool, upon the condition that the size of the selected DXF feature is not larger than the size of the image area, the edge detection command according to the measurement tool comprising the location information of the measurement tool, and the location information of the measurement tool comprising a center of the measurement tool, and an angle between the measurement tool and positive direction of the horizontal line, and an edge detection range of the measurement tool;

a processing module operable to reselect at least two measurement tools, and the generation module further operable to generate an edge detection command corresponding to each of the reselected measurement tools, upon the condition that the size of the selected DXF feature is larger than the size of the image area, the edge detection command corresponding to each of the reselected measurement tools comprising location information of each of the reselected the measurement tools, an angle between each of the reselected the measurement tools and positive direction of the horizontal line, and an edge detection range of each of the reselected the measurement tools, wherein coordinates of a center of each of the reselected measurement tool of the location information of the each of the reselected the measurement tools is confirmed by:

smoothing the selected DXF feature by removing rough edge of the selected DXF feature;

dividing the selected DXF feature averagely according to a number of the reselected measurement tools, the divided DXF feature having at least two node points corresponding to the reselected measurement tools; and determining each of the node points as the center of one of the reselected measurement tools.

10. The computer as described in claim 9, wherein the one or more programs further comprising:

an adjusting module operable to adjust a display proportion of the DXF display area to make the DXF display area display full screen on the computer.

11. The computer as described in claim 9, wherein the one or more programs further comprising:

a message module operable to display a prompt message on the display interface to prompt a user to reselect the measurement tool or the selected DXF feature upon the condition that the measurement tool is not appropriate to measure the selected DXF feature.

12. The method as described in claim 9, wherein the coordinates of the center of the measurement tool are the same as the coordinates of the center of the selected DXF feature to determine a location of the measurement tool, upon the condition that the size of the selected DXF feature is not larger than the size of the image area.

\* \* \* \* \*